United States Patent
Thakkar et al.

(10) Patent No.: US 6,456,083 B1
(45) Date of Patent: Sep. 24, 2002

(54) METHOD AND APPARATUS FOR DIAGNOSING SHORT CIRCUIT CONDITIONS

(75) Inventors: Kirit A. Thakkar, Parma; Cheryl Greenly, Elyria; William Amato, Avon; Roman Marchak, Sheffield Lake, all of OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 09/518,615

(22) Filed: Mar. 3, 2000

(51) Int. Cl.⁷ .......................... G01R 31/00; G05D 15/00
(52) U.S. Cl. .................... 324/500; 324/73.1; 324/158.1
(58) Field of Search ................................ 324/500, 555, 324/73.1, 158.1; 361/42, 71

(56) References Cited

U.S. PATENT DOCUMENTS

| | | | | |
|---|---|---|---|---|
| 3,761,889 A | * | 9/1973 | Hallee et al. ............ | 340/172.5 |
| 4,084,166 A | * | 4/1978 | Kawasaki et al. ........ | 354/23 D |
| 4,804,921 A | * | 2/1989 | Putrow et al. ............ | 324/394 |
| 4,972,133 A | * | 11/1990 | Hirota et al. ............ | 318/646 |

* cited by examiner

Primary Examiner—Michael Sherry
Assistant Examiner—Paresh Patel

(57) ABSTRACT

A method and apparatus for diagnosing short circuit conditions in a circuit protects circuit components from being damaged during a diagnostic operation. The apparatus includes a control processor, a control circuit coupled to the control processor, and an A/D converter coupled to the control processor and the control circuit. In operation the control processor disables operation of an A/D converter after completion of a conversion operation, enables operation of the control circuit after operation of the A/D converter has been disabled, enables operation of the A/D converter to obtain an analog signal from the control circuit after operation of the control circuit has been enabled, and disables operation of the control circuit after enabling operation of the A/D converter to obtain the analog signal. The A/D converter converts the analog signal into a digital signal and the control processor analyzes the digital signal to determine if a short circuit condition exits in the control circuit. The control processor enables operation of the control circuit for a period that is less than an over current rating period of components of the control circuit, thereby insuring that the components of the control circuit will not be damaged if a short circuit condition exits.

9 Claims, 4 Drawing Sheets

METHOD AND APPARATUS FOR DIAGNOSING SHORT CIRCUIT CONDITIONS

FIELD OF THE INVENTION

The invention relates in general to a method and apparatus for diagnosing short circuit conditions. More specifically, the invention relates to a method and apparatus for diagnosing short circuit conditions of solenoids utilized in electro-pneumatic braking systems.

BACKGROUND OF THE INVENTION

Electro-pneumatic braking systems have been proposed in which electronic controls are utilized to control the operation of conventional pneumatic brakes employed on heavy vehicles such as tractor trailer rigs. FIG. 1 illustrates a proposed electro-pneumatic braking system, wherein braking commands are sent from a central control processor 14 to an electronic control unit 12 that controls the operation of a proportional valve P1 to supply air pressure from a reservoir pressure line to a brake chamber 14. A pressure sensor 16 supplies a feedback signal to the electronic control unit 12 indicative of the output pressure of the proportional valve P1. In the event of failure of the electronic control system, an isolation valve P2 is provided to switch the flow of air supplied to the brake chamber 14 from the output of the proportional valve P1 to a service pressure line of a conventional pneumatic brake control system, thereby guaranteeing that a loss of electronic control will not result in a loss of brake control. The normally closed position of the isolation valve P2 preferably connects the service pressure line to the brake chamber 14, such that any loss of signal from the electronic control unit 12 will automatically result in the isolation valve P2 reverting to the normally closed position to permit pneumatic braking control.

FIG. 2 illustrates a proposed electronic control circuit for use in the electronic control unit 12. A proportional solenoid S1 is used to control operation of the proportional valve P1. Power is supplied to the proportional solenoid S1 by device driver U2 that acts as a high side switch upon receipt of a control signal (PROP_HI_EN) received from the central control processor 10. Current flow through the proportional solenoid S1 is controlled by a transistor Q1 in response to a pulse width modulated signal (PROPORTIONAL_LO_EN) provided by the central control processor 10. An analog feedback signal (PROPORTIONAL_AN) is provided to an analog-to-digital (A/D) converter, which converts the analog feedback signal into a digital signal that can be analyzed by the central control processor 10. A status signal (HI_SIDE_ST) is also supplied to the central control processor 10 by the device driver U2.

The central control processor 10 can determine whether the proportional solenoid S1 is short circuited by analyzing the feedback signal during a diagnostic operation. If a short circuit condition exists, the control processor 10 deactivates an isolation signal (ISOLATION_HI_EN) that is normally supplied to the device driver U2 to active an isolation solenoid (not shown) that controls the operation of the isolation valve P2. Absent the isolation signal, the isolation valve P2 cuts air flow from the proportional valve P1 to the brake chamber 10, and connects the brake chamber 10 to the service line to allow the brakes to be operated solely by pneumatic control.

While the above-described operation is effective to bypass operation of the electo-pneumatic control when a short circuit condition arises, the short circuit condition may also cause damage to circuit components themselves. For example, the transistor Q1 has a limited over current capability, and can be permanently damaged if the time required to perform the diagnostic operation exceeds the over current capability limit of the transistor Q1. Such a condition can arise if the A/D converter is not ready to accept the analog feedback signal for conversion when the proportional circuit is turned on, thereby causing a delay in the performance of the diagnostic operation.

In view of the above, it is an object of the invention to provide a method and apparatus for diagnosing short circuit conditions that prevents damage to circuit components from occurring during a diagnostic operation.

SUMMARY OF THE INVENTION

The invention provides a method and apparatus for diagnosing short circuit conditions in a circuit. The apparatus includes a control processor, a control circuit coupled to the control processor, and an A/D converter coupled to the control processor and the control circuit. In operation the control processor disables operation of an A/D converter after completion of a conversion operation, enables operation of the control circuit after operation of the A/D converter has been disabled, enables operation of the A/D converter to obtain an analog signal from the control circuit after operation of the control circuit has been enabled, and disables operation of the control circuit after enabling operation of the A/D converter to obtain and convert the analog signal. The A/D converter converts the analog signal into a digital signal and the control processor analyzes the digital signal to determine if a short circuit condition exits in the control circuit. The control processor enables operation of the control circuit for a period that is less than an over current rating period of components of the control circuit, thereby insuring that the components of the control circuit will not be damaged if a short circuit condition exits.

Other advantages and features of the invention will become apparent from the following detailed description of the preferred embodiments of the invention and the accompanying drawings.

BRIEF DESCRIPTION OF THE DRAWINGS

The invention will be described with reference to certain preferred embodiments thereof and the accompanying drawings, wherein.

DETAILED DESCRIPTION OF THE PREFERRED EMBODIMENTS OF THE INVENTION

Figure 1:
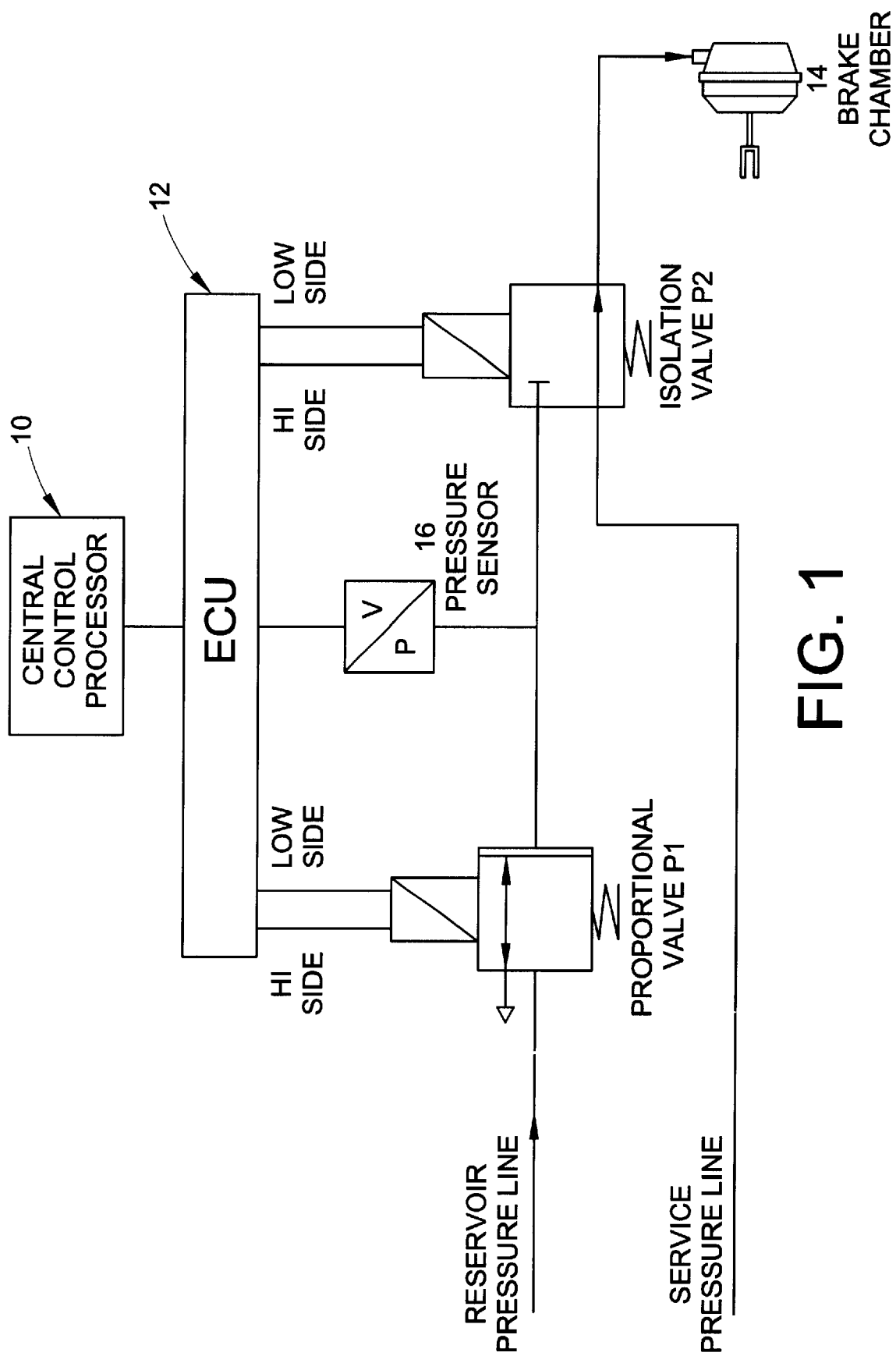
FIG. 1 is a schematic block diagram illustrating a preferred electro-pneumatic brake control system.
Figure 2:
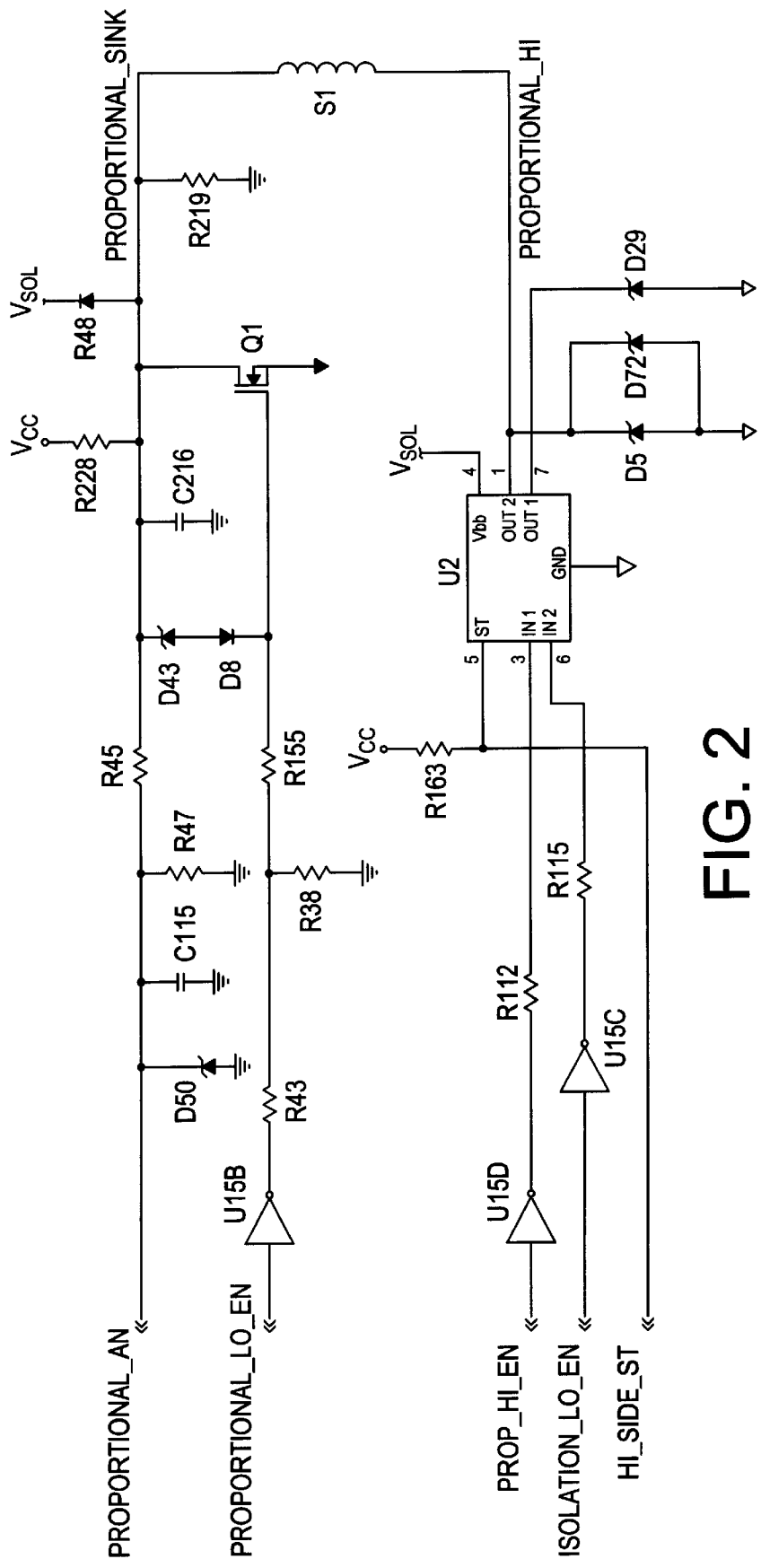
FIG. 2 illustrates an example of a preferred electro-pneumatic control circuit.
Figure 3:
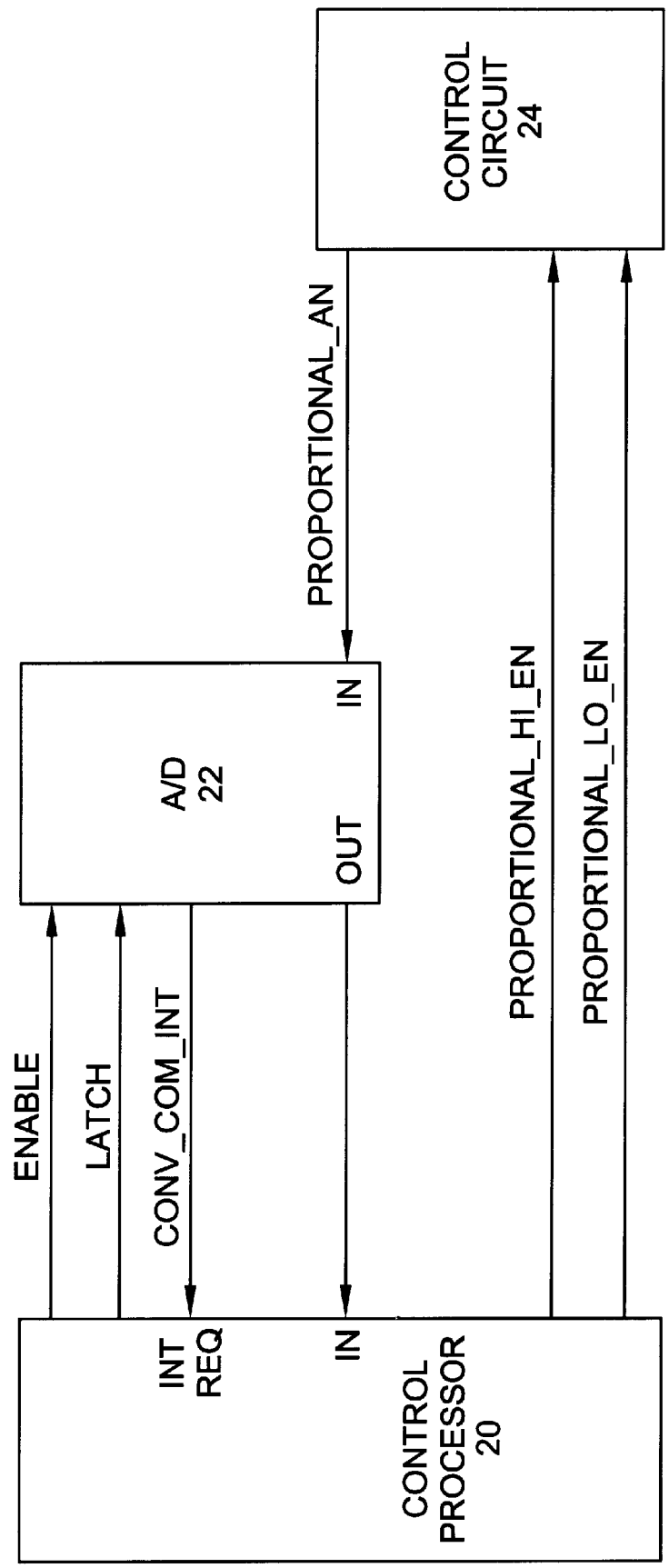
FIG. 3 is a schematic block diagram of a control system in accordance with the invention.

A control circuit in accordance with a preferred embodiment of the invention is illustrated in FIG. 3 as including a control processor 20, an A/D converter 22 and an electro-pneumatic control circuit 24. The control processor 20 can be implemented using conventional microprocessors, microcontrollers, discrete circuit components, application specific integrated circuits (ASICs) or any combination thereof. Although the A/D converter 22 is illustrated as a separate component from the control processor 20 for purposes of illustrating the invention, it will be understood that the functions of the A/D converter 22 may be incorporated within the structure of the control processor 20 instead of in a separate discrete device coupled thereto, and the invention is not limited to the use of separate components. The electro-pneumatic control circuit 24 is preferably of the type illustrated in FIG. 2, although a variety of circuit configurations to accomplish the same function are possible. While only a single control circuit 24 is illustrated, it will be understood that a plurality of control circuits 24 are provided to control various brake chambers of a vehicle.

The control processor 20 controls the operation of the A/D converter 22 through an operation enable signal (ENABLE). Operation of the A/D converter 22 is disabled when the enable signal is at a particular logic state (for example a logic low), while operation is enabled when the signal is at an opposite logic state (logic high). When enabled, the A/D converter 22 latches an analog input signal, in this case the analog feedback signal from the control circuit 24, in response to a latch signal (LATCH) received from the control processor 20. The A/D converter 22 converts the latched analog feedback signal into a digital signal, and notifies the control processor 20 of completion of the conversion process by supplying a conversion complete interrupt signal (CONV_COM_INT) to the control processor 20. The control processor 20 then latches the digital output signal supplied by the A/D converter 22 and analyzes the value of the digital signal to determine if a short circuit condition exists.

In order to check for a short circuit condition, the control processor 20 activates the device driver U2 and the transistor Q1 by supplying the PROPORTIONAL_HI_EN signal and the PROPORTIONAL_LO_EN signal to the control circuit 24. However, if the transistor Q1 is turned on before the A/D converter 22 is in a condition to accept the analog feedback signal, too much time may elapse before the analog feedback signal can be latched and the diagnostic test completed. As a result, circuit elements, such as the transistor Q1, may exceed their rated over current capability.

One approach to solving this problem would be to utilize components having over current capabilities that would exceed the maximum possible time required to perform the diagnostic operation. The use of such components, however, would greatly increase the cost of the control circuit 24. Accordingly, instead of using higher rated components, the control processor 20 performs a specific set of operations to make certain that the control circuit 24 is turned on for the absolute minimum amount of time required to perform the diagnostic test., thereby minimizing the possibility of damage to circuit components.

Figure 4:
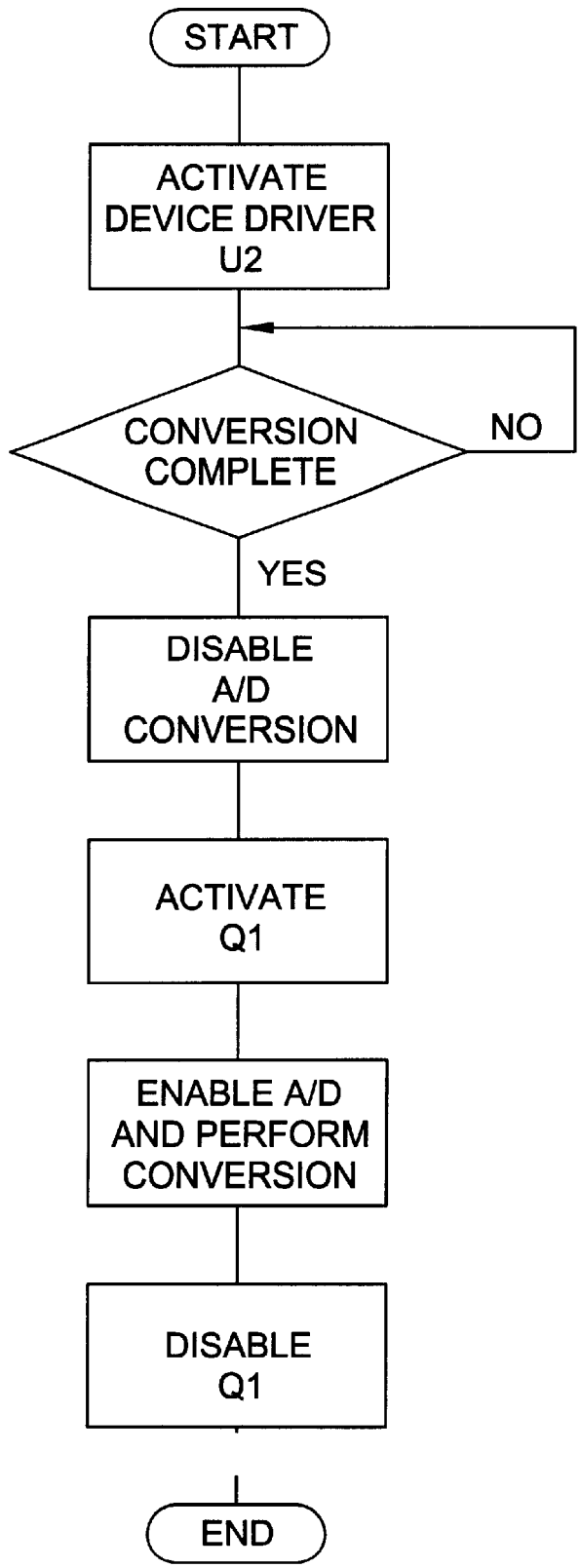
FIG. 4 illustrates an operational flow diagram of a control processor utilized in the control system illustrated in FIG. 3.

A flow diagram of a preferred diagnostic operation is illustrated in FIG. 4. The control processor 20 activates the device driver U2 to supply power to the proportional solenoid by supplying the PROP_HI_EN signal. The control processor 20 then waits to receive the conversion complete interrupt signal from the A/D converter 22. Upon receipt of the conversion complete interrupt signal, the control processor 20 disables operation of the A/D converter 22, thereby preventing the A/D converter 22 from performing further operations. The A/D converter 22 is now effectively dedicated to waiting until the analog reference signal is available from the control circuit 24. The control processor 20 then turns on the transistor Q1 by application of the PROPORTIONAL_LO_EN signal, enables operation of the A/D converter 22, and sends the latch signal to the A/D converter 22 causing the A/D converter 22 to latch the analog feedback signal. As soon as the analog feedback signal is latched by the A/D converter 22, the control processor 20 turns off the PROPORTIONAL_LO_EN signal.

The amount of time that the control circuit 24 is turned on is limited to the amount of time required to have the A/D converter 22 latch the analog feedback signal. Accordingly, instead of having the control circuit 24 turned on and waiting until the A/D converter 22 is ready, the A/D converter 22 is held in a standby condition so that the analog reference signal can be latched in the minimum amount of time. Total operation time of the control circuit 24 can therefore be limited to less than the over current rating time of components such as the transistor Q1, which can only sustain the over current condition for a period of up to approximately 100 microseconds, although the time period will vary depending on the components utilized in the circuit.

The invention has been described with reference to certain preferred embodiments thereof. It will be understood, however, that modifications and variations are possible within the scope of the appended claims.

What is claimed is:

1. An apparatus comprising:
    a control processor;
    a control circuit coupled to the control processor; and
    an A/D converter coupled to the control processor and the control circuit;
    wherein the control processor disables operation of an A/D converter after completion of a conversion operation, enables operation of the control circuit after operation of the A/D converter has been disabled, enables operation of the A/D converter to obtain an analog signal from the control circuit after operation of the control circuit has been enabled, and disables operation of the control circuit after enabling operation of the A/D converter to obtain the analog signal.

2. An apparatus as claimed in claim 1, wherein the A/D converter converts the analog signal into a digital signal and the control processor analyzes the digital signal to determine if a short circuit condition exists in the control circuit.

3. An apparatus as claimed in claim 1, wherein the control circuit is an electro-pneumatic control circuit that includes a solenoid including an input coupled to a device driver and an output coupled to a current control device.

4. An apparatus as claimed in claim 3, wherein the control device is a transistor controlled by a pulse width modulated control signal.

5. An apparatus as claimed in claim 3, wherein the current control device has an over current operation capacity of a predefined period, and wherein the control processor enables operation of the control circuit for less than the predefined period.

6. An apparatus as claimed in claim 3, wherein the control processor enables operation of the control circuit for a period not greater than 100 microseconds.

7. A method of diagnosing short circuit conditions within a control circuit, comprising:
    disabling operation of an A/D converter after completion of a conversion operation;
    enabling operation of the control circuit after operation of the A/D converter has been disabled;
    enabling operation of the A/D converter to obtain an analog signal from the control circuit after operation of the control circuit has been enabled, wherein the A/D converter converts the analog signal into a digital signal;

disabling operation of the control circuit after the A/D converter obtains the analog signal and converts the analog signal into a digital signal.

8. A method as claimed in claim 7, further comprising analyzing the digital signal to determine whether a short circuit condition exists within the control circuit.

9. A method as claimed in claim 7, wherein operation of the control circuit is enabled for a period of time less than an over current rating time of a component of the control circuit.

* * * * *